United States Patent
Visser

(10) Patent No.: US 8,320,531 B2
(45) Date of Patent: *Nov. 27, 2012

(54) TEMPLATE-BASED ELECTRONIC MESSAGE GENERATION USING SOUND INPUT

(75) Inventor: Roger E. Visser, Bellevue, WA (US)

(73) Assignee: Applied Voice & Speech Technologies, Inc., Foothill Ranch, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/019,225

(22) Filed: Feb. 1, 2011

(65) Prior Publication Data

US 2011/0305325 A1    Dec. 15, 2011

Related U.S. Application Data

(63) Continuation of application No. 11/454,382, filed on Jun. 16, 2006, now Pat. No. 7,903,793.

(51) Int. Cl.
*H04M 1/64* (2006.01)
(52) U.S. Cl. ............... 379/88.01; 379/88.16; 379/88.18; 704/270; 704/275
(58) Field of Classification Search ............... 379/88.01, 379/88.16, 88.18; 704/270, 275
See application file for complete search history.

(56) References Cited

U.S. PATENT DOCUMENTS

2002/0159573 A1* 10/2002 Hitzeman et al. .......... 379/88.17

* cited by examiner

*Primary Examiner* — Gerald Gauthier
*Assistant Examiner* — Simon King
(74) *Attorney, Agent, or Firm* — Anatoly S. Weiser, Esq.; Acuity Law Group

(57) ABSTRACT

A unified messaging system enables a subscriber to log into the system remotely and compose and send text messages, such as email messages, using predefined templates and sound input. The sound input may be DTMF or speech. After the subscriber selects an appropriate template, the system confirms the template, and asks the subscriber to provide values for prompted variables, such as dates and times. The system then generates an email message as defined by the selected template and the values of the prompted variables provided by the subscriber. The email message may also include automatic variables, such as the subscriber's name, and company name. The generated email message may be a new message, a reply message, or a forwarding message. The reply and forwarding messages may be generated in response to received email, or in response to other received messages, such as voice mail messages and facsimiles.

20 Claims, 3 Drawing Sheets

TEMPLATE-BASED ELECTRONIC MESSAGE GENERATION USING SOUND INPUT

CROSS-REFERENCE TO RELATED APPLICATION

This application is a continuation of and claims priority to U.S. patent application Ser. No. 11/454,382, entitled TEMPLATE-BASED ELECTRONIC MESSAGE GENERATION USING SOUND INPUT, filed on Jun. 16, 2006 now U.S. Pat. No. 7,903,793, now allowed. The disclosure of the foregoing patent document is incorporated herein by reference as if fully set forth herein, to including Specification, Figures, Claims, and Tables.

FIELD OF THE INVENTION

The present invention relates generally to telecommunication systems and methods, and, more particularly, to telephony systems such as telephone call management and auto attendant systems, and to electronic messaging systems such as email, instant messaging, short message service, and unified messaging systems.

BACKGROUND

It is becoming increasingly inconvenient to be disconnected from email, instant messaging (IM), short message service (SMS), and other similar electronic messaging systems, even for short periods of time. To be sure, expansion of wireless connectivity and improved portability of wireless communication devices have made staying connected easier than ever. At the same time, it is still inconvenient to create relatively long text messages from portable wireless devices, such as personal digital assistants (PDAs) and cellular telephones. And it is also inconvenient constantly to carry around even smaller notebook and tablet computers. Furthermore, sometimes email, contact information, and files (which a user may want to attach to email) are best available from a particular physical location, for example, one's place of employment. In sum, there are circumstances when sending email needs to be done from a remote server using a portable communication device that is not well suited for typing long messages and attaching files.

Telephone systems and telephone service providers offer a wide range of voice communication services, including call answering, voice messaging, and automated attendant (auto attendant) services. With the trend towards combining voice communications with electronic communications (e.g., email, IM, SMS, facsimile), unified messaging systems have emerged. In a unified messaging systems, multiple types of communication services are available to a subscriber. For example, a subscriber's voice, facsimile, email, IM, and other messages may be stored on such a system and made available to the subscriber upon demand. The subscriber may be able to log into such system remotely, and receive (view, listen to) voice and electronic messages, as well as send electronic messages and originate telephone calls from the system. The system may also include additional capabilities intended to facilitate communications with the subscriber when the subscriber is connected to the system remotely through a telephone network. For example, the system may include a text-to-speech converter for reading to the remotely-connected subscriber stored facsimile and email messages.

The difficulty of remotely sending text messages, however, remains unabated, because this difficulty is a result of the limited size of portable devices, and of unavailability to the subscriber of a communication device with a relatively large size keyboard and locally-stored files that the subscriber may wish to attach to email.

SUMMARY

One solution for creating email using speech requires reliable and robust Speech-To-Text dictation systems. Because such systems are not available with the current technology, a need exists for systems to facilitate sending messages from telephones, such as cellular telephones and other portable devices. A further need exists to facilitate composing and sending text messages using speech commands. Another need exists to facilitate composing and sending text messages using key commands, such as dual tone multi-frequency (DTMF) commands. Still another need exists for communication systems that allow a remote subscriber to send customized email messages using voice and/or key commands.

The present invention is directed to methods, apparatus, and articles of manufacture that satisfy one or more of these needs. In an exemplary embodiment, the invention herein disclosed is a method of creating a text-based message (such as an email message) for sending from a communication system. The method includes: (1) establishing a telephone connection between the system and a subscriber, (2) receiving through the connection a first sound input from the subscriber, the first sound input identifying a template for creating the email message having a body of text, (3) creating the email message from the template, (4) receiving through the connection from the subscriber a second sound input confirming that the subscriber wishes to send the email message, and (5) sending the email message.

In aspects of the invention, the template includes a first prompted variable corresponding to a first prompted variable text field of the email message, and the method also includes: (1) prompting the subscriber to provide value for the first prompted variable, (2) receiving through the connection from the subscriber a third sound input identifying the value for the first prompted variable, and (3) determining from the third sound input the value for the first prompted variable. As part of the step of creating, the value of the first prompted variable is included as text in the first variable text field of the email message.

In aspects of the invention, the third sound input includes first speech input, and the step of determining from the third sound input includes processing the third sound input with an automatic speech recognition (ASR) module.

In aspects of the invention, the first prompted variable is a time variable, a day of week variable, a date variable, a name variable, a currency variable specifying cost, a number variable, a telephone number variable, or a word variable specifying a word from a list defined by the subscriber.

In aspects of the invention, the template also includes a sound file.

In aspects of the invention, the email message is a forward or reply message relating to a received message.

In aspects of the invention, the received message is included or attached to the email message. Received facsimile and voice messages may also be attached to the email message.

In an exemplary embodiment, the invention herein disclosed is a communication system that includes a telephone interface configured to receive telephone calls, an email interface configured to send and receive email messages, a memory storing program code, and a processor coupled to the memory, the telephone interface, and the email interface. The processor is configured to execute the code and, under control of the code, to cause the system to perform steps of the methods described in the preceding paragraphs.

In an exemplary embodiment, the invention herein disclosed is an article a machine-readable storage medium with program code stored in the medium. When the program code is executed by a processor of a unified communication system that includes a telephone interface configured to receive telephone calls, an email interface configured to send and receive email messages, and the processor, the processor being coupled to the memory, the telephone interface, and the email interface, the program code causes the processor to configure the unified communication system to perform steps of the methods described in the preceding paragraphs.

These and other features and aspects of the present invention will be better understood with reference to the following description, drawings, and appended claims.

DETAILED DESCRIPTION

Figure 1:
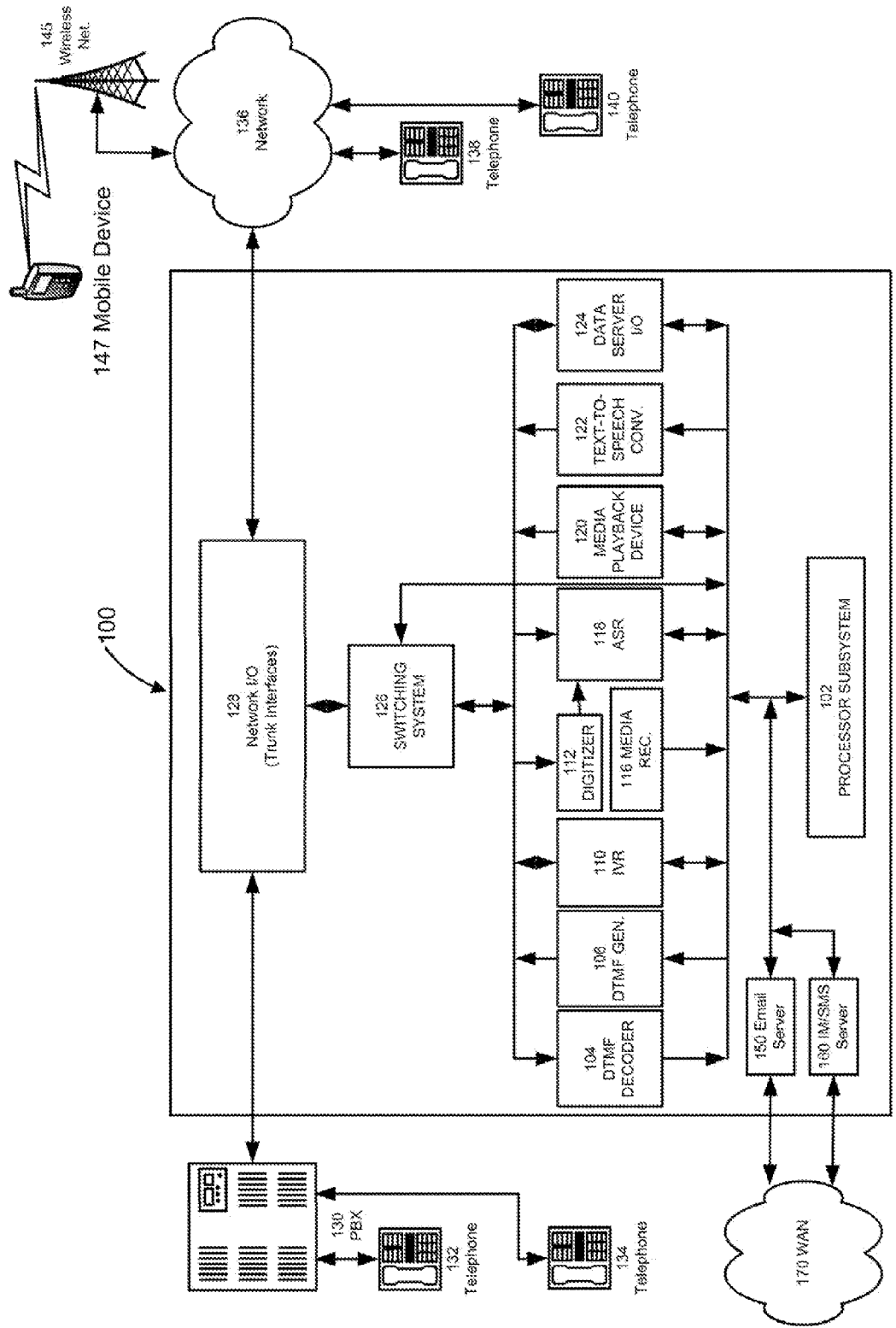
FIG. 1 is a high-level block diagram illustrating selected elements of a messaging system configured to enable a subscriber to send email using sound input, in accordance with aspects or the present invention.

Reference will now be made in detail to several embodiments of the invention that are illustrated in the accompanying drawings. Same or similar reference numerals may be used in the drawings and the description to refer to the same or like items. The drawings are in simplified form, not to scale, and omit apparatus elements and method steps that can be added to the described systems and methods, while possibly including certain optional elements and steps.

In this document, the words "embodiment" and "variant" refer to particular apparatus, process, or article of manufacture, and not necessarily to the same apparatus, process, or article of manufacture. Thus, "one embodiment" (or a similar expression) used in one place or context can refer to a particular apparatus, process, or article of manufacture: the same or a similar expression in a different place can refer to a different apparatus, process, or article of manufacture. The expression "alternative embodiment" and similar phrases are used to indicate one of a number of different possible embodiments. The number of possible embodiments is not necessarily limited to two or any other quantity. Characterization of an embodiment as "exemplary" means that the embodiment is used as an example. Such characterization does not necessarily mean that the embodiment is a preferred embodiment; the embodiment may but need not be a currently preferred embodiment.

The word "subscriber" signifies a person who can receive and send text electronic messages (such as email messages) using a particular messaging system. Generally, a subscriber has a preexisting association with the system. For example, a subscriber may be an employee of an organization using the messaging system. A "subscriber" may be able to place a telephone call to the messaging system, log into the system and access at least limited functionality of the system.

The words "couple," "connect," and similar expressions with their inflectional morphemes do not necessarily import an immediate or direct connection, but include connections through mediate elements within their meaning.

Other and further definitions (both explicit and implicit) and clarifications of definitions may be found throughout this document. All the definitions are intended to assist in understanding this disclosure and the appended claims, but the broad scope and spirit of the invention should not be construed as strictly limited to the definitions, or to the particular examples described in this specification.

Referring more particularly to the drawings, FIG. 1 is a high-level block diagram of a unified messaging system 100 that can be used to implement processes described in this document. The unified messaging system 100 includes telephony interfaces 128 that couple the system 100 to a network 136 and to switching equipment 130. In the embodiment illustrated in FIG. 1, the switching equipment 130 is a circuit switched Private Branch Exchange (PBX), while the network 136 is a public switched telephone network (PSTN). In other embodiments, the switching equipment may be of a different kind, for example, an automated call distributor (ACD). The network 136 can be, for example, the Internet, an intranet, an extranet, a virtual private network (VPN), a local area network (LAN), a wide area network (WAN), an enterprise network, or a private switched network. The network 136 may be coupled to cellular radio networks, such as the wireless network 145, so that the unified messaging system 100 can receive inbound calls from cellular telephones and other mobile devices (e.g., mobile device 147), and place outbound calls to such mobile devices.

The system 100 may be able to interface simultaneously with several different networks, such as the networks listed above. The system 100 may also interface with several different switches. For example, a unified messaging system may be connected at the same time to a public switched telephone network and to the Internet, managing (1) Voice over Internet Protocol (VoIP) calls switched by an Internet Protocol PBX, (2) PSTN calls switched by a conventional circuit switched PBX, (3) receiving and sending email through an email server, (4) receiving and sending IM messages through an IM server, and (5) receiving and sending SMS messages through an SMS service provider. The PBX 130 may be included in the system 100.

Returning to the embodiment illustrated in FIG. 1, the telephony interfaces 128 may include analog, digital, and VoIP trunks or stations. A switching matrix 126 is interposed between the telephony interfaces 128 and other components of the unified messaging system 100, selectively connecting inbound and outbound calls between various constituent components of the unified messaging system 100. In addition to the switching matrix 126 and the telephony interfaces 128, the constituent components of the system 100 include a processor subsystem 102, a dual tone multi-frequency (DTMF) decoder 104, a DTMF generator 106, an interactive voice response (IVR) module 110, an audio digitizer 112, a media (audio) recorder 116, an automatic speech recognition (ASR) module 118, a media (audio) playback device 120, a text-to-speech converter 122, and a data server interface 124.

The processor subsystem 102 may include one or more processors with supporting circuitry and chipsets, such as microprocessors, memories, and interface circuits that are known to a person skilled in the art. In one embodiment, the processor subsystem 102 includes a general purpose microprocessor and a digital signal processor (DSP). The processor or processors of the subsystem 102 execute program code stored in one or more memories. The code may be loaded from another machine-readable medium, such as a CD, DVD, flash memory, floppy or hard drive, or a similar device.

The processor subsystem 102 is coupled to an email server 150 and an IM/SMS server 160, to enable the subscribers of the unified messaging system 100 to send and receive email messages and instant messages/SMS through a wide area network 170 (e.g., the Internet).

The DTMF decoder 104 detects dual tone multi-frequency signals in telephone calls and generates corresponding signals readable by the processor subsystem 102. For example, an external caller (for example, a subscriber) can input DTMF signals from the keypad of the telephone 140 when asked by the IVR module 110 to make a menu selection. In response to the DTMF signals, the processor subsystem 102 may cause the unified messaging system 100 to perform the functions selected by the caller. As will be discussed in more detail in relation to the automatic speech recognition module 118, voice input can be used instead of or in addition to the DTMF input.

The DTMF generator 106 generates DTMF signals under control of the processor subsystem 102. For example, the system 100 may generate the DTMF signals to place an external call. The unified messaging system 100 may place the external call for a subscriber calling from outside, so that subscribers who are traveling can call and log into the system 100, and have their calls placed from the system 100. External calls may also be placed when the unified messaging system 100 implements a "Call Me Back" feature, which allows a subscriber to call and log into the system 100, and have the system immediately call the subscriber back at a designated number, thereby lowering the subscriber's telecommunication charges (e.g., air time and long distance charges). Land lines, most of European cellular network operators, and certain U.S. cellular network operators do not charge for incoming calls. As still another example, the system 100 may generate DTMF signals when placing an external call to notify a subscriber regarding messages left for the subscriber. The messages may include, for example, voicemail messages, facsimile messages, email messages, and preprogrammed reminders.

The IVR module 110 automates certain interactions between the callers and the system 100. If the caller is a subscriber, the system 100 may use the IVR block 110 to verify the subscriber's identity, and then play received and stored messages intended for the subscriber, as well as notify the subscriber of received email and facsimile messages. The system 100 may also allow the subscriber at a remote location to change answering and forwarding options. For other callers, the system 100 may provide interactive functionality for identifying a proper recipient for the call, and navigating among the various extensions available on the PBX 130.

Many other uses for the IVR block 110 will surely occur to a person skilled in the art.

The digitizer 112 converts received analog audio signals into digital form.

The media recorder 116 stores the audio signals, under direction of the processor subsystem 102. For example, the media recorder 116 may record messages lea by callers for the subscribers of the unified messaging system 100. In one embodiment, the media recorder 116 includes an interface to mass storage devices, such as an interface to a redundant array of inexpensive disks (RAID). The mass storage devices may be a part of the unified messaging system 100, or be separate from the system 100.

The ASR module 118 recognizes spoken words and phrases in audio streams of telephone calls, and generates corresponding signals readable by the processor subsystem 102. The ASR module 118 may be used in conjunction with the IVR module 110 to interpret callers' voice input to the system 100. In response to the menu selections offered by the IVR module 110, a caller can speak the desired selections, such as name or extension number of the called party. The ASR module 118 identifies the name or the extension number (or another selection) from spoken words, and sends corresponding signals to the processor subsystem 102. The processor subsystem 102 then causes the unified messaging system 100 to perform the functions selected by the caller, for example, connecting the caller to the selected person or extension.

The media playback device 120 plays audio files to the callers and subscribers. For example, the playback device 120 may include an interface to the mass storage devices used by the media recorder 116. The playback device 120 can access the messages stored by the media recorder 116, and play the messages to the subscribers upon request and after proper identification.

As implied by its name, the text-to-speech converter 122 converts text into speech. When the unified messaging system 100 is part of a unified communications messaging system, the text-to-speech converter 122 may enable a subscriber at a remote location to access (over a telephone connection) facsimile, email, and voicemail messages sent to the subscriber and received by the system 100.

The data server interface 124 provides access to various data files that may be used by the system 100 or requested by the subscribers or callers of the system 100. The data available for retrieval through the data server interface 124 may include, for example, subscriber email, contacts, and calendar entries. The data server interface may also store and retrieve customer orders, and provide corporate data to the callers. In one example, the data server interface 124 includes interfaces to Microsoft Exchange® and Lotus Domino® servers.

As will be explained in more detail below, the data server interface 124, the DTMF decoder 104, the IVR module 110, and the ASK module 118 may also used when a subscriber sends email and IM/SMS messages from the system 100.

It should be noted that the various modules illustrated in FIG. 1 can be implemented in hardware, in software, or as a combination of hardware and software components. For example, the DTMF decoding and automatic speech recognition functions of modules 104 and 118 may be performed by the digital signal processor or another processor of the processor subsystem 102. The lines dividing the various modules of the unified messaging system 100 in FIG. 1 should therefore be understood as logical dividers used mainly for illustration and ease of description at a relatively high conceptual level.

For certain additional details of the system 100, see commonly-assigned U.S. patent application Ser. No. 10/932,745, entitled Apparatus and Method for Personalized Call Acknowledgement, which application is incorporated by reference herein in its entirety, including Figures and claims.

The unified messaging system 100 described above may be used to send from a remote location text messages, such as email messages. Although email messages will be described throughout most of the remainder of this Detailed Description, it should be understood that IM/SMS and possibly other messages may be sent from the system 100 using substantially the same methods. Email messages may be sent using only voice input, only DTMF input, a combination of voice and DTMF input, as well as other input techniques. Email messages may be sent with or without attachments. Email messages may be sent as Reply and Forwarded messages responsive to received email messages, or as original email messages.

Figure 2:
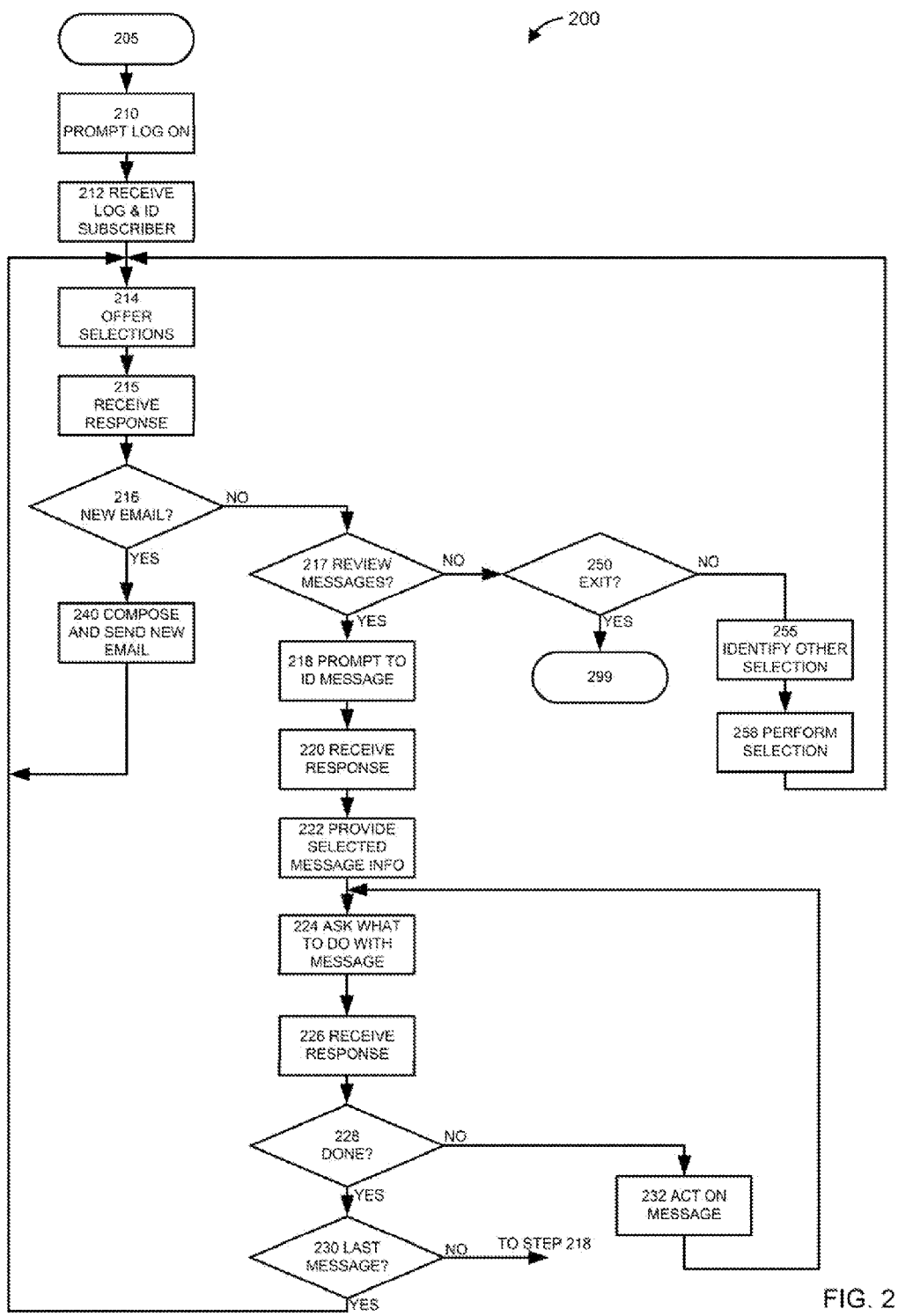
FIG. 2 is a process flow diagram illustrating selected steps of a process for remotely sending an email message, in accordance with aspects of the present invention.

FIG. 2 is a process flow diagram illustrating selected steps of a process 200 for remotely sending an email message. The steps may be performed by the system 100. The various components of the system 100 performing the steps are configured and directed by the processor subsystem 102, in which one or more processors execute steps of program code.

In the course of the process 200, the input provided by the subscriber to the system may be sent, for example, as DTMF and/or voice (speech) input. The DTMF input is decoded by the DTMF decoder 104, and the voice input is interpreted by the ASR module 118. When the received input cannot be interpreted or does not fall within expected parameters, the system may prompt the subscriber to repeat the input, transfer the subscriber to an operator, disconnect the call (particularly in case of a failure to properly log into the system within a predetermined number of attempts), or otherwise process the exception in one of the ways that a person skilled in the art would be able to design after perusal of this document.

Beginning at flow point 205, the system has received an inbound telephone call from a subscriber.

At step 210, the system prompts the subscriber to log into the system, using voice instructions.

At step 212, the system receives the subscriber's response to the prompt to identify him- or herself, and identifies the subscriber. As part of the steps 210 and 212, the system may ask the subscriber to identify him- or herself by name or another designation, and then prompt the subscriber to enter a password.

After the subscriber has successfully logged into the system, process flow proceeds to step 214, offering to the subscriber a number of selections. The offered selections include "email" selections. The offered selections may also include an "exit" selection indicating that the system should terminate the call.

At step 215, the system receives the subscriber's selection responsive to the step 214.

If the subscriber chooses to compose new email, as determined by the system in decision block 216, process flow continues to step 240 to create a new email message. After the new message is sent, process flow may return to the step 214.

If the subscriber chooses to review messages, as determined by the system in decision blocks 216 and 217, process flow advances to step 218. Otherwise, process flow proceeds to decision block 250 to determine whether the subscriber's response indicates that the subscriber wishes to exit the menu. If so, the process terminates at flow point 299. Otherwise, the subscriber's selection is interpreted at step 255, and corresponding action is performed at step 258. Process flow then returns to the step 214.

Returning now to the step 218, the system prompts the subscriber to identify the message that the subscriber wishes to review. Note that step 218 may be subsumed within the step 214. For example, the system may automatically begin playing the first voice or email message in response to a specific command such as get email messages or get voicemail messages.

At step 220, the system receives the subscriber's response to the prompt of the step 218. For example, the subscriber may choose to review email beginning with the latest email messages, email messages in a particular folder, email messages from a specific sender, or other messages. Note that the subscriber may choose to review not only email messages, but other types of messages as well, for example, facsimile messages and voice mail messages.

At step 222, the system provides to the subscriber information regarding the first selected email message. For example, the system may read to the subscriber a selected email message using TTS. The subscriber may interrupt the reading at any time, for example, by pressing a predetermined DTMF key or saying "stop" or another predetermined word or phrase.

After the system has finished reading the email message or the reading was interrupted, process flow advances to step 224, in which the system asks the subscriber what the subscriber would like to do with the message. At step 226, the system receives the subscriber's response and, at decision block 228, the system determines whether the response indicates that the subscriber is done with the particular message read. For example, the subscriber can say "done" or "next message" to indicate that no further action need to be taken with respect to the message.

If the subscriber is done with the message, process now advances to decision block 230 to determine whether the last message has been read. If so, process flow returns to the step 214. Otherwise, process flow returns to step 218, to allow the subscriber to select another message.

If the subscriber is not done with the message, as determined in decision block 228, process flow advances to step 232, in which the system acts on the message consistent with the subscriber's response received in the step 226, and then returns to the step 224. Thus, the system may perform a number of operations on the same email message.

We now proceed to provide additional examples of the steps 232 and 240. It should be understood that the specific examples provided illustrate broad principles, and that invention is not limited to the specific examples given below.

In a relatively simple case, the subscriber may wish to acknowledge the receipt of an email message with a predetermined message. For example, the subscriber's response in the step 226 may be "Reply with text." The system would then send a predetermined reply email message to the sender of the received message, such as "I wanted to let you know that I received your email and I will get hack to you as soon as I return to the office." Similarly, the subscriber's response in the step 226 may be "Forward with text," to cause the system to forward the message with another predetermined message appended to it. The appended message may be, for example, "Please look into this for me since I am out of the office." In this case, the system may forward the message to a predetermined recipient, or prompt the subscriber to provide the recipient's name, email address, or another identification. Since there is only one reply message and one forward (appended) message, the reply and forward messages could be immediate, or after a confirmation by the subscriber.

Multiple reply and/or forward messages may also be provided in the step 232. In this case, the subscriber would provide the system with a selection of a first reply or forward message, either as part of the response in the step 226, or separately, for example, in response to a system prompt. The process flow would then return to the step 224, and, with appropriate responses, proceed to the step 232 once again. The subscriber can then send another reply or forward message, as described above. These steps can be repeated to compose and send more than two reply and/or forward messages. The subscriber may also act on the read message without sending email. For example, the subscriber may delete the message, mark it as unread, or place it in a fielder of the email program used by the subscriber, such as Outlook® of Microsoft Corporation. The subscriber may have the system perform these actions on the read message immediately after listening to the message, or after replying or forwarding the read message. For example, the subscriber may reply to the message, and then delete it.

Table 1 below illustrates interaction of the system with a subscriber during which the subscriber causes the system to reply to a received message. This interaction takes place after the system read the message to the subscriber over a telephone connection, using the text to speech converter.

Generally, at the step 232 the system allows the subscriber to select whether to reply or forward a message, select appropriate template for the selected type of message, and, if the selected template has one or more variable fields, select the value for each of the variable fields. Similarly, at the step 240, the system allows the subscriber to select the intended recipients (addressees) of the new message, select a template for the new message, and, if the selected template has one or more

TABLE 1

| ACTOR | PROMPT/RESPONSE/TEMPLATE FOR SYS RESPONSE | COMMENT |
|---|---|---|
| System | "What would you like to do with this message?" | Step 224. |
| Subscriber | "Reply with text." | Step 226. |
| System | "Please choose one of the following email replies or say CANCEL." (Template_choose_reply.vox) "Out of Office." "Call me." "..." | Step 232. |
| Subscriber | "Out of Office." | Step 232. |
| System | "The following email is ready to send." (Template_email_ready.vox) "I wanted to let you know that I received your message and I will get back to you as soon as I return to the office." "End of text message." (Template_end_of_text.vox) "Would you like to SEND, REVIEW, or CANCEL this email? (Template_send_menu.vox) | Step 232. |
| Subscriber | "Send" | Step 232. |
| System | "Message sent." (msg_sent.vox) | Sending the message, step 232. |
| System | "What would you like to do with this message?" | Returning to step 224. |

The above examples of the step 232, though complete in their own right, are non-customized responses. For example, if the subscriber wanted to respond with "I'll get back to you "Monday," unique predetermined messages may be needed for the other days of the week. This may make the subscriber's interaction with the system lengthy and confusing. To avoid having a different message for each day of the week, a variable for the day may be used; it is simpler to ask for the day than managing and choosing one of multiple responses in which the only difference is the day. In this way, a single "Out of Office" response may be used, with the system prompting the subscriber for the day of the week, which is used as a variable. The text used to generate the email is now not the exact message to be sent, but instead a text with an embedded variable requiring substitution. The text is essentially a template used to create the body of the outgoing email text, not the exact body of the email.

variable fields, select the value for each of the variable fields. Thus, templates for email message generation may be used to generate a new email message, text introduction to a forwarded email message (the appended message), or reply to an email message. Templates may define both the telephone interaction between the subscriber creating the email message, and the content of the email message. A template may have both fixed and variable information. Therefore, the exact content of the resulting email message depends not only upon the fixed content of the selected template, but also upon how the email creator (subscriber) fills out the template variables. Templates can be created at the factory, created on site by the system's administrator, and/or created by the individual subscribers. Various aspects of templates are described below, including template content, template creation, and template usage.

Table 2 below illustrates an example of the use of an email template to send a new text email message.

TABLE 2

(New Text Email)

| ACTOR | PROMPT/RESPONSE/TEMPLATE FOR SYS RESPONSE | COMMENT |
|---|---|---|
| System | "What would you like to do?" | Step 214. |
| Subscriber | "Create text email." | Step 215. |
| System | "Please choose one of the following text email messages or say CANCEL." (Template_choose_email.vox) "Out of Office" "Call me" "Gone Until Day" "..." | Step 240. |
| Subscriber | "Out of Office." | Step 240. |
| System | "The 'Out of Office' email provides a courtesy notice that you are out of the office but does not indicate your return date or time. The email includes your virtual extension." | Step 240 (template introduction). |

TABLE 2-continued (New Text Email)

| ACTOR | PROMPT/RESPONSE/TEMPLATE FOR SYS RESPONSE | COMMENT |
|---|---|---|
| System | "The following email is ready to send." (Template_email_ready.vox) "I am currently away from the office. If needed, you may call me at 1234567890. Thank you, John Smith." "End of text message." (Template_end_of_text.vox) "Please say the name of the person who should receive this message, MODIFY, REVIEW, or CANCEL? (Template_address_modify_menu.vox) | Step 240. |
| Subscriber | "Jane Doe." | Step 240. |
| System | "Jane Doe Added. Would you like to send this message to anyone else?" | Step 240. |
| Subscriber | "No" | Step 240. |
| System | "Message Sent." (msg_sent.vox) | Step 240. |
| System | "What would you like to do?" | Returning to step 214. |

Table 3 below illustrates an example of the use of an email template to send a text reply email message. The message sent by the system may be a reply to a received email message, voice mail message, or facsimile message. In the example given, an email message results in each of these cases. For the voice, facsimile, and email cases, the original message may be attached.

TABLE 3

(Reply Text Email)

| ACTOR | PROMPT/RESPONSE/TEMPLATE FOR SYS RESPONSE | COMMENT |
|---|---|---|
| System | "What would you like to do with this message?" | Step 224. |
| Subscriber | "Reply with text." | Step 226. |
| System | "Please choose one of the following text email responses or say CANCEL." (Template_choose_reply.vox) "Call Me" "I Will Call You" ". . ." | Step 232. |
| Subscriber | "Call Me" | Step 232. |
| System | "The 'Call Me' reply asks the recipient to call you at your virtual extension to discuss the original message because you are currently out of the office." | Step 232 (template introduction). |
| System | "The following email is ready to send." (Template_email_ready.vox) "I am currently away from the office, but would be interested in discussing this matter with you personally. Please call me at 1234567890. Thank you, John Smith." "End of text message." (Template_end_of_text.vox) "Would you like to SEND, MODIFY, REVIEW, or CANCEL this email?" | Step 232. |
| Subscriber | "Send." | Step 232. |
| System | "Message Sent." (msg_sent.vox) | Step 232. |
| System | "What would you like to do with this message?" | Returning to step 224. |

Table 4 below illustrates an example of the use of an email template to send a text email message forwarding a received email message with an introduction. The email message sent by the system may forward an email message, voice mail message, or facsimile message. In the example given, an email message results in each of these cases. For the voice, facsimile, and email cases, the original message may be attached.

TABLE 4

(Forward Text Email)

| ACTOR | PROMPT/RESPONSE/TEMPLATE FOR SYS RESPONSE | COMMENT |
|---|---|---|
| System | "What would you like to do with this message?" | Step 224. |
| Subscriber | "Forward with text." | Step 226. |
| System | "Please choose one of the following text email forwarding introductions or say CANCEL." (Template_choose_forward.vox) "Assist Customer" | Step 232. |

TABLE 4-continued (Forward Text Email)

| ACTOR | PROMPT/RESPONSE/TEMPLATE FOR SYS RESPONSE | COMMENT |
|---|---|---|
| | "Assist Me" | |
| | "..." | |
| Subscriber | "Assist Customer." | Step 232. |
| System | "The 'Assist Customer' introduction asks the recipient to help the customer with the issue in the attached message because you are out of the office. The text includes your virtual extension." | Step 232 (template introduction). |
| System | "The following email is ready to send." (Template_email_ready.vox) "I am currently away from the office and will not be able to address this customer's problem in a timely manner. I appreciate any help you can provide. If you have any questions, please call me at 1234567890. Thank you, John Smith." "End of text message." (Template_end_of_text.vox) "Please say the name of the person who should receive this message, MODIFY, REVIEW, or CANCEL? (Template_address_modify_menu.vox) | Step 232. |
| Subscriber | "Jane Doe." | Step 232. |
| System | "Jane Doe Added. Would you like to send this message to anyone else?" | Step 232. |
| Subscriber | "No." | Step 232. |
| System | "Message Sent." (msg_sent.vox) | Step 232. |
| System | "What would you like to do with this message?" | Returning to step 224. |

By default, a template introduction is played after the user chooses the template. As illustrated in the above examples, the template introduction confirms that the correct template was selected, and lists basic uses for the template. Additionally, the template introduction informs the subscriber of the variables that are used by the template.

With repeated use, the template introductions may seem redundant or excessively time consuming for an expert subscriber. To save time, the system may be configured to allow the subscriber to skip the template introduction. For example, the system may recognize when the subscriber says a predetermined word or phrase, such as "skip" or "skip text introduction," and skip the template introduction in response. The actual grammar may be as follows:

( skip ) { return(("skip_template_intro")) }
( skip ?text [intro introduction] ) { return(("skip_template_intro")) }

The system may also be configured to disable the template introductions. For example, the system may recognize when the subscriber says a predetermined word or phrase, for example. "disable text email introduction," and disable template introductions from that point on. Once disabled, no template introductions will be played for any templates until the subscriber enables the template introductions. For example, the system may recognize when the subscriber says a predetermined word or phrase, such as, "enable text email introduction." and enable the template introductions in response.

The system may be configured to allow the subscriber who has called into the system to enable and disable template introductions from the main menu only. Tables 5 and 6 below illustrate, respectively, enabling and disabling template introductions.

TABLE 5

(Enabling Template Introductions)

| ACTOR | PROMPT/RESPONSE/TEMPLATE FOR SYS RESPONSE |
|---|---|
| System | "What would you like to do?" |
| Subscriber | "Enable text email introductions." |
| System | "Text email introductions are now . . . " |
| | (template_intro_are_now.vox) |
| | "on." |

TABLE 6

(Disabling Template Introductions)

| ACTOR | PROMPT/RESPONSE/TEMPLATE FOR SYS RESPONSE |
|---|---|
| System | "What would you like to do?" |
| Subscriber | "Disable text email introductions." |
| System | "Text email introductions are now . . . " |
| | (template_intro_are_now.vox) |
| | "off." |

The actual grammar is as follows:

(enable text ?email [intro introduction introductions]) {return(("enable_template_intro"))}

(disable text ?email [intro introduction introductions]) {return(("disable_template_intro"))}

Table 7 below illustrates an example of the use of an email template to send a text email message forwarding a received email message with an introduction, with the template introductions disabled. In other respects, the example of Table 7 is identical to the example illustrated in Table 4.

TABLE 7

(Forward Text Email/Template Introductions Disabled)

| ACTOR | PROMPT/RESPONSE/TEMPLATE FOR SYS RESPONSE | COMMENT |
|---|---|---|
| System | "What would you like to do with this message?" | Step 224. |
| Subscriber | "Forward with text." | Step 226. |
| System | "Please choose one of the following text email forwarding introductions or say CANCEL." (Template_choose_forward.vox) "Assist Customer" "Assist Me" ". . ." | Step 232. |
| Subscriber | "Assist Customer." | Step 232. |
| System | "Assist Customer" ". . . selected." (template_selected.vox) | Step 232 (confirmation without template introduction). |
| System | "The following email is ready to send." (Template_email_ready.vox) "I am currently away from the office and will not be able to address this customer's problem in a timely manner. I appreciate any help you can provide. If you have any questions, please call me at 1234567890. Thank you, John Smith." "End of text message." (Template_end_of_text.vox) "Please say the name of the person who should receive this message, MODIFY, REVIEW, or CANCEL? (Template_address_modify_menu.vox) | Step 232. |
| Subscriber | "Jane Doe." | Step 232. |
| System | "Jane Doe Added. Would you like to send this message to anyone else?" | Step 232. |
| Subscriber | "No." | Step 232. |
| System | "Message Sent." (msg_sent.vox) | Step 232. |
| System | "What would you like to do with this message?" | Returning to step 224. |

Note that the read back of the composed email, which follows the template introduction, may also be skipped in response to a subscriber's command, such as "SEND" or "SEND MESSAGE," resulting in the message being sent when the recipient is known to the system (as in the case of a reply message). Read back may also be skipped if the subscriber speaks the name of an addressee of the message, the name being added to the list of recipients of the message (for example, when the message is a new message or a forwarded message).

When the selected template includes one or more non-automatic, prompted variable fields, the system presents to the subscriber a dialog to find the value for each of the variable fields. This is done whether or not the template introduction for the selected template is played to the subscriber. Table 8 below illustrates an example of the use of an email template requiring a "day" as input for a variable field to compose and send a new email message. This example also shows how the email creator (subscriber) can correct the data in a composed message before the message is sent. Once the user says "Modify," all the variables will be re-prompted and the completed email will again be spoken to the user.

TABLE 8

(New Text Email with Variable Field and Modification)

| ACTOR | PROMPT/RESPONSE/TEMPLATE FOR SYS RESPONSE | COMMENT |
|---|---|---|
| System | "What would you like to do?" | Step 214. |
| Subscriber | "Create text email." | Step 215. |
| System | "Please choose one of the following text email messages or say CANCEL." (Template_choose_email.vox) "Out of Office" "Call me" "Gone Until Day" ". . ." | Step 240. |
| Subscriber | "Gone Until Day." | Step 240. |
| System | "The "Gone Until Day' email provides a courtesy notice that you are out of the office but will be back on a particular date. When asked, say either the day of the week or the calendar date when you will be back in your office. The email includes your virtual extension. "For what day?" (Template_var_day.vox) | Step 240 (template introduction). |
| Subscriber | "Friday." | Step 240 (providing variable input). |

TABLE 8-continued (New Text Email with Variable Field and Modification)

| ACTOR | PROMPT/RESPONSE/TEMPLATE FOR SYS RESPONSE | COMMENT |
|---|---|---|
| System | "The following email is ready to send." (Template_email_ready.vox) "I am currently away from the office until May 12, 2006. If needed, you may call me at 1234567890. Thank you, John Smith." "End of text message." (Template_end_of_text.vox) | Step 240. |
| System | "Please say the name of the person who should receive this message, MODIFY, REVIEW, or CANCEL? (Template_address_modify_menu.vox) | Step 240. |
| Subscriber | "Modify." | Step 240. |
| System | "For what day?" (Template_var_day.vox) | Step 240. |
| Subscriber | "Monday." | Step 240 (providing modified variable input). |
| System | "The following email is ready to send." (Template_email_ready.vox) "I am currently away from the office until May 15, 2006. If needed, you may call me at 1234567890. Thank you, John Smith." "End of text message." (Template_end_of_text.vox) | Step 240. |
| System | "Please say the name of the person who should receive this message, MODIFY, REVIEW, or CANCEL? (Template_address_modify_menu.vox) | Step 240. |
| Subscriber | "Jane Doe." | Step 240. |
| System | "Jane Doe Added. Would you like to send this message to anyone else?" | Step 240. |
| Subscriber | "No" | Step 240. |
| System | "Message Sent." (msg_sent.vox) | Step 240. |
| System | "What would you like to do?" | Returning to step 214. |

Automatic variables are variables whose values are assignable at the time the email message is being created, and whose values may be known to the system without the subscriber's input. Typically, automatic variables are not prompted. Two exceptions are the "Virtual Extension" and the "Locate Number" (telephone numbers where the subscriber may be called) when the subscriber has not previously defined them. In both cases, the fact that the data is missing is noted and the system requests the subscriber to provide an alternate number. Tables 9 and 10 below illustrate, respectively, examples where the system requests the "Virtual Extension" and "Locate Number" that have not been previously provided by the subscriber. Note that these examples have been abbreviated in comparison to the previous examples; each example begins with the subscriber's selection of "Call Me" template, and ends with the email message being composed and ready to be sent. Additionally, template introductions have been disabled in these examples.

TABLE 9

("Virtual Extension" Automatic Variable Undefined and Supplied By Subscriber)

| ACTOR | PROMPT/RESPONSE/TEMPLATE FOR SYS RESPONSE |
|---|---|
| Subscriber | "Call Me." |
| System | Call Me" "... selected." (Template_selected.vox) "I'm sorry, your Virtual Extension is not set up." (template_no_virtual.vox) "What is the telephone Number?" (template_var_phonenumber.vox) |
| Subscriber | "1234567890." |
| System | "The following email is ready to send." (Template_email_ready.vox) "I am currently away from the office, but would be interested in discussing this matter with you personally. Please call me at 1234567890. Thank you, John Smith." "End of text message." (Template_end_of_text.vox) |

TABLE 10

("Locate Number" Automatic Variable Undefined and Supplied By Subscriber)

| ACTOR | PROMPT/RESPONSE/TEMPLATE FOR SYS RESPONSE |
|---|---|
| Subscriber | "Call Me." |
| System | Call Me" "... selected." (Template_selected.vox) "I'm sorry, your Locate Number is not set up." (template_no_locate.vox) "What is the telephone Number?" (template_var_phonenumber.vox) |
| Subscriber | "1234567890." |
| System | "The following email is ready to send." (Template_email_ready.vox) "I am currently away from the office, but would be interested in discussing this matter with you personally. Please call me at 1234567890. Thank you, John Smith." "End of text message." (Template_end_of_text.vox) |

Multiple recipients can be specified in the same manner as is used in addressing a normal email message. Since the message being created is an email message, each recipient is expected to have an email address. Both subscribers and contacts having email addresses can be recipients. Table 11 below illustrates an example where the subscriber adds multiple recipients to a new email message. This is also an abbreviated example, beginning with the system asking for the recipient of the email message, and ending with the message being sent. A similar dialog would be used for a forwarded email message.

TABLE 11

(Additions of Multiple Recipients)

| ACTOR | PROMPT/RESPONSE/TEMPLATE FOR SYS RESPONSE |
|---|---|
| System | "Please say the name of the person who should receive this message, MODIFY, REVIEW, or CANCEL? (Template_address_modify_menu.vox) |
| Subscriber | "Jane Doe." |
| System | "Jane Doe Added." "Would you like to send this message to anyone else?" |
| Subscriber | "Yes." |
| System | "Who else should receive this message? To send say done." |
| Subscriber | "Jim Smith." |
| System | "No email address is available." (Template_NoEmailAdress.vox) |
| System | "Who else should receive this message? To send say done." |
| Subscriber | "John Doe." |
| System | "John Doe Added." |
| System | "Who else should receive this message? To send say done." |
| Subscriber | "Done." |
| System | "Message Sent." (msg_sent.vox) "What would you like to do?" |

Templates may be implemented as XML files that control the content of generated email messages using specific text, optional variables, and control directives arranged in a meaningful order. Below is the general format of an XML template file of a variant of the system 100:

```
<?xml version="1.0" encoding="UTF-8" standalone="no"?>
<TemplateDefinition>
.....
</TemplateDefinition>
```

Each XML Template may begin with the document declaration statement in the first line. The remainder of the document content is between the start and end TemplateDefinition tags and contains literal text, variables, and directives.

As has already been mentioned, automatic variables are assignable at the time the email message is being created and whose values may be known to the system without the subscriber's input. Variables that the creator of the email supplies at the time of email creation are called prompted variables. When the value of an automatic variable is known, it is automatically substituted for the variable when the email message is being created. Automatic variables may be defined as follows in XML:

```
<Variable type="auto">
    <Name>internal name</Name>
</Variable>
```

Here, the internal name is replaced by the specific automatic variable desired. Notice the type="auto" modifier. It instructs the application code not to attempt to query for the substitution.

There may be one variable of any type (automatic or prompted) in a single Segment. If multiple variables are needed, they may be placed in one or more additional segments. Automatic variables may be contained between the start and end TextBody tags, and may be further nested between the start and end Segment tags, as shown below.

```
<?xml version="1.0" encoding="UTF-8" standalone="no"?>
<TemplateDefinition>
    <TextBody>
        <Segment>
            <Variable type="auto">
                <Name>$myvirtual</Name>
            </Variable>
        </Segment>....
</TemplateDefinition>
```

Automatic variables may relate to the sender of the email, who is not known until the time the email is being created. The source of this information is typically the subscriber's mailbox, which may include the sender's name, extension, associated telephone numbers, and email address. Automatic variables may also include site, time, day, and signature line. The signature line may be, for example, subscriber- or company-specific. A company-specific signature line may include main telephone number, web site, company name, and company slogan.

In a variant of the system 100, all prompted variables are predefined and cover the most common cases, including such items as dates, times, subscriber names, numbers, telephone numbers, costs, and the desired reply options. Other variants also have custom prompted variables.

Prompted variables may be defined as follows in the XML:

```
<Variable "">
    <Name>internal name</Name>
</Variable>
```

In the above notation, the internal name is replaced by the specific prompted variable desired.

Prompted variables may be contained between the start and end TextBody tags and, be further nested between the start and end Segment tags, as shown below:

```
<?xml version="1.0" encoding="UTF-8" standalone="no"?>
<TemplateDefinition>
    <TextBody>
        <Segment>
            <Variable>
                <Name>$day</Name>
            </Variable>
        </Segment>....
</TemplateDefinition>
```

The prompts requesting input for each variable field may be generic. This can lead to some confusion when the email creator is not sure how the variable will be used, such as in the case when multiple variables of the same type are requested. This is often the case in date and time ranges. To alleviate some of the potential confusion, the time and date variables also have starting and ending versions. When used appropriately in the template, starting and ending versions avoid some of the confusion when asking twice for the time, or asking twice for the date.

It may be desirable to have at least some control over the formatting of the variables in the resulting email, in order to improve the overall quality and readability of the email. This is most often the case in presenting dates, times, and costs. To avoid developing a complex formatting scheme, a simple scheme may be adopted, for example, to follow the Windows regional settings to the extent possible. When such scheme is adopted, in most cases the variable will determine its format.

To allow multiple output formats of similar data, in some variants, multiple versions of certain variables exist that result in different output text formatting. For example, $day, $date, and $daydate are three ways of formatting a specific day such as "next Monday," "December 26," or "Monday, December 26," respectively. The grammar used for all day/date variables may be the same.

Table 12 below describes each of the prompted variables in one variant of the system 100.

TABLE 12

(Prompted Variables)

| Internal Variable Name | Display Name | Prompt | Grammar Set | Comments |
|---|---|---|---|---|
| $day | Day of Week | For what day? | Yesterday, today, tomorrow, Sunday-Saturday, Next Sunday-Saturday, Last Sunday-Saturday, Or any calendar date | This attempts to format the text without the date even if a date is spoken. If a date is spoken that falls outside of the past week, the present week, or the next week, the format defaults to $daydate, $startdaydate, and $enddaydate format. Examples: Today Tomorrow Yesterday Last Tuesday Next Sunday Thursday |
| $startday | Starting Day of Week | For what starting day? | | |
| $endday | Ending Day of Week | For what ending day? | | |
| $date | Calendar Date | For what day? | | Format the text as a numeric date. Examples: June 1 December 31 |
| $startdate | Starting Calendar Date | For what starting day? | | |
| $enddate | Ending Calendar Date | For what ending day? | | |
| $daydate | Calendar Date with Day of Week | For what day? | | Formats the text as a day of the week followed by the numeric date. Examples: Wednesday, Jun. 1, 2005 Saturday, Dec. 31, 2006 |
| $startdaydate | Starting Calendar Date With Day of Week | For what starting day? | | |
| $enddaydate | Ending Calendar Date with Day of Week | For what ending day? | | |
| $timeofday | Time of Day | At what time? | Standard time formats including optional hours, minutes, AM, and PM. | Time will be displayed in the format of the system. Examples: "Four forty five" -> 4:45 AM "Four thirty" AM -> 4:45 AM "Four" -> 4:00 AM "Four PM" -> 4:00 PM |
| $starttimeofday | Starting Time of Day | What is the starting time? | | |
| $endtimeofday | Ending Time of Day | What is the ending time | | |
| $timelength | Length of Time | For how long? | A time without AM or PM with optional words "hour(s)" and "minute(s)" | Will only include minute if the time is not in even hours. Examples "Four forty five" -> 4 hours and 45 minutes. "Four" -> 4 hours "Four minutes" -> 4 minutes "Four hours" -> 4 hours |
| $number | Number | Say the number. | Numeric value | Formats the recognized number as a simple series of consecutive digits. |
| $phonenumber | Telephone Number | What is the telephone number? | A series of numeric digits | Formats the recognized digits as a simple series of consecutive digits. For 10 digit numbers, it could optionally format the digits with dashes as in 425-945-3600 |
| $cost | Cost | What is the cost in dollars and cents? | Numbers, dollar, dollars, cents, point, decimal | Formats the number as a series of digits with imbedded comments and a leading dollar (pound) sign and a decimal point. Examples $4,327.05 $29.21 $6,123,456.78 |
| $subscribername | Subscriber Name | Which Subscriber? | The current subscriber name directory. | The full name of the recognized subscriber will replace the $subscribername. Example "Give $subscribername a call . . . " Is replace with "Give John Smith a call . . . " |

TABLE 12-continued (Prompted Variables)

| Internal Variable Name | Display Name | Prompt | Grammar Set | Comments |
|---|---|---|---|---|
| $replyaction | Reply Action | Which response action is preferred? Locate, call, SMS, IM, or email. | Locate, call, SMS, IM, email. | Use as a verb in a sentence such as "Locate me at . . . " "Call me at . . . " "SMS me at "IM me . . . " "Email me at . . . " |

The system may allow its users (e.g., subscribers) to define word or phrase prompted variables to be selected from a list. For example, a subscriber may be able to define a list of locations including "Home," "Office," and "School" locations for a template of an email that advises recipients where the subscriber is at the time the email is sent. When prompted, the subscriber then specifies his or her location, saying "Home," "Office," or "School."

Directives may be designed to control the system's interaction with the subscriber when using templates to create email messages, for example, audio interactions and prescriptions of how individual templates are to be used. Directives may be included in the Template XML file and implemented as start and end tags. The following exemplary directives may be used:
Type
SpokenName
SpokenNameFile
SpokenIntro
SpokenIntroFile
SpokenNameAliases
Subject
TextBody Out-Of-Office template shown below illustrates the use of each of these directives (the directives are underlined). This template requires one variable indicating on which day the subscriber will respond further. The subscriber may say a day of the week, or a calendar date.

```
<?xml version="1.0" encoding="utf-8" ?>
<TemplateDefinition>
    <Type>reply</Type>
    <SpokenName>Out of Office</SpokenName>
    <SpokenNameFile>OutOfOffice.wav</SpokenNameFile>
    <SpokenIntro>
    </SpokenIntro>
    <SpokenIntroFile>OutofOfficeReplyIntro.wav</SpokenIntroFile>
    <SpokenNameAliases>
        <Alias>Out of Office</Alias>
        <Alias>Out of the Office</Alias>
        .....
    </SpokenNameAliases>
    <Subject>Out of Office</Subject>
    <TextBody>
    ...
    </TextBody>
</TemplateDefinition>
```

We now proceed to describe briefly each of these directives as they are used in a variant of the system 100.

Type Directive: There are three uses of email templates: (1) replying to a message, forwarding a message, and creating a new email message. The content of these generated emails is assumed to be different enough so that they may be not interchangeable in use. Therefore, the first directive of an email template is its type. Valid types are (1) reply, (2) forward, and (3) new.

SpokenName Directive: A unique phrase is assigned to each template; each phrase may be short enough to be easily spoken and recognized, yet long enough to indicate the template's purpose. The spoken and recognized name of a template is specified using the SpokenName directive. When creating a new Template, the SpokenName is used as both the display name and the TTS (text-to-speech) name. By default it may also be the first recognition alias (seethe SpokenNameAliases directive below).

SpokenNameFile Directive: When presenting the name of a template in a list or menu, the system may play the SpokenName using TTS. For commonly used templates, especially system templates, it may be desirable to play a prompt instead. This is accomplished using the SpokenNameFile directive. The file may be and 8K μ-law file in WAV format and may include the ".WAV" extension. Both the SpokenName and SpokenNameFile directives can be used. The prompt precedence may be to use the SpokenNameFile directive first, then the SpokenName directive. The audio recording may be the same as the recognition grammar, to help the user/subscriber to select the template using speech.

SpokenIntro and SpokenIntroFile Directives: After a template has been selected using speech commands, it may be useful to briefly introduce the usage and parameter requirements of the template. This can be accomplished using the SpokenIntro and SpokenIntroFile directives. The SpokenIntroFile may be and 8K μ-law file in WAV format and may include the ".WAV" extension. If the SpokenIntro directive and the SpokenIntroFile directives are missing, no introduction is played after selection. (Recall also that the Template Introductions may be disabled and enabled by the subscriber.) Even if a SpokenIntroFile is used, a script of the audio may be included in the SpokenIntro directive.

Subject Directive: Typically, the subject line of a forwarded or replied to email is the original email prefaced by "Fw:" or "Re:" opening. A new email subject, however, is not created in this manner. To specify the subject of a new email, the Subject directive is used. If the Subject directive is missing in the template file, the subject is the subject line of the email being forwarded or replied too preceded by "Fw:" or "Re:" opening for forward and reply emails, respectively. The subject used for the new email is the same as the subject of the email with the template text file attachment. This is summarized below for each template type:

Subject: FW: <subject of message being forwarded>
Subject: RE: <subject of message being replied to>
Subject: <subject of the email that includes the template text file>

SpokenNameAliases Directive: In order to recognize which template the email creator wishes to use, the template name may be included in the recognition grammar. This is done using the SpokenNameAliases directive. The directive includes a sub start and end token called "Alias" so that multiple recognition phrases can be included for one template, as shown below.

```
<SpokenNameAliases>
    <Alias>Out of Office</Alias>
    <Alias>Out of the Office</Alias>
    .....
</SpokenNameAliases>
```

TextBody Directive: The general form of the text body is a collection of one or more segments. Each segment can include one segment of text and one variable. Segment order is maintained when creating the email text from the TextBody directive. However, the variable is always placed after the text when the email is composed, regardless of its order in the XML file. Therefore, in the following example, the output email text will be "I am out until $day." Note that the <Text>.</Text> is included in its own Segment.

```
<?xml version="1.0" encoding="UTF-8" standalone="no"?>
<TemplateDefinition>
....
    <TextBody>
        <Segment>
            <Text>I am out until </Text>
            <Variable>
                <Name>$day</Name>
            </Variable>
        </Segment>....
        <Segment>
            <Text>. </Text>
        </Segment>
    <TextBody>
</TemplateDefinition>
```

Since the audio prompt associated with the $day prompted variable in this example is "What day?" there may be times when the user may want to change it. The following shows the XML statements to do this using the Prompts, Prompt, Text, and File start and end tags.

```
<TextBody>
    <Segment>
        <Text>I am out until </Text>
        <Variable>
            <Name>$day</Name>
            <Prompts>
                <!-- Context sensitive question -->
                <Prompt>
                    <!-- TTS if no audio -->
                    <Text>When will you return to
                    the office?</Text>
                    <!-- audio file -->
                    <File>CustomPrompt.wav</File>
                </Prompt>
            </Prompts>
        </Variable>
    </Segment>....
    <Segment>
        <Text>. </Text>
    </Segment>
</TextBody>
```

Multiple audio prompt files can be used. They may be played in order. As with the other audio files, if missing, the text may be spoken to the subscriber using TTS. If both audio and text are missing, the default prompt may be used.

Figure 3:
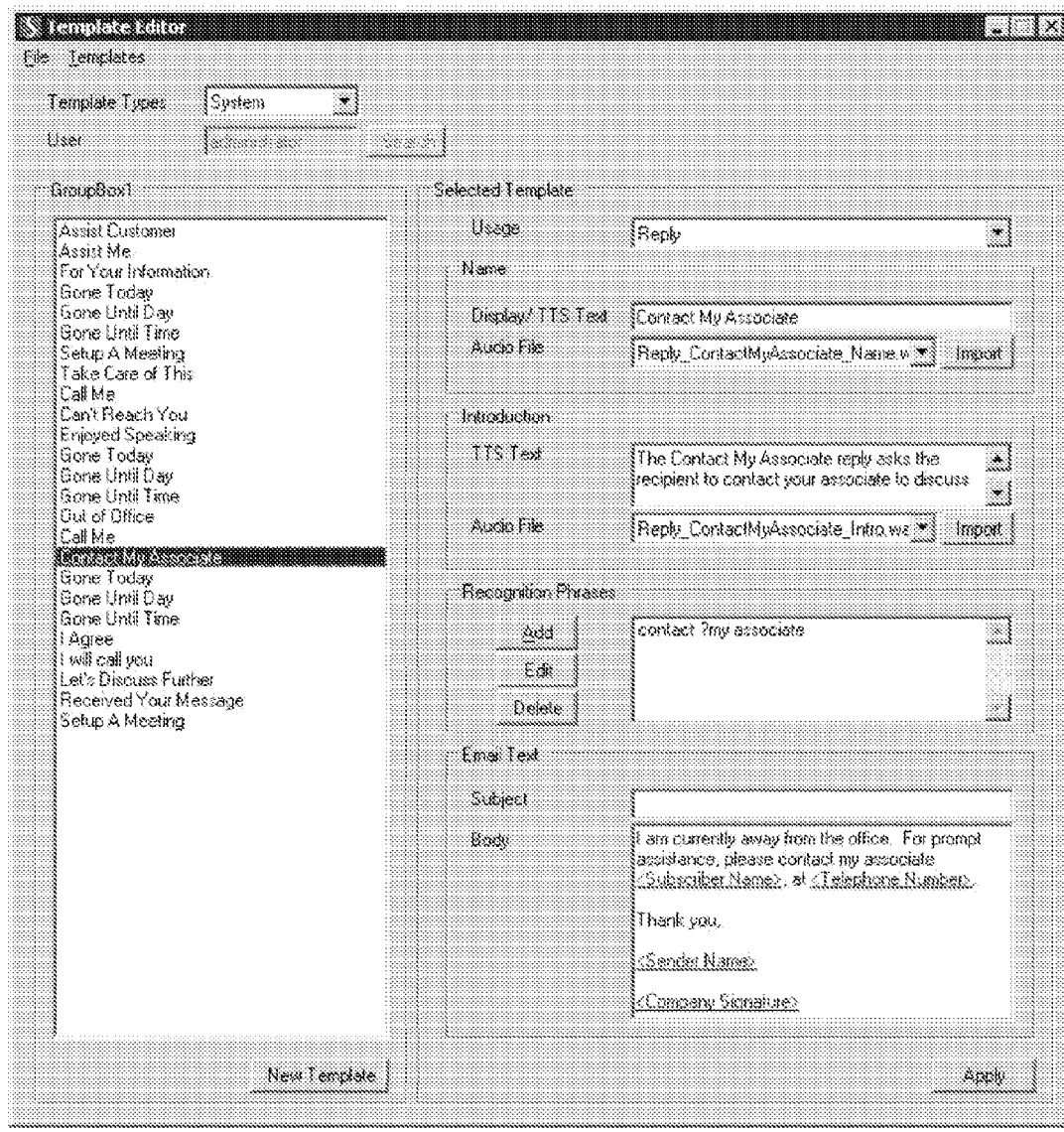
FIG. 3 shows a display of a graphical user interface to a template editor used to create and manage templates for generating email messages, in accordance with aspects of the present invention.

There may be two basic groups of templates: (1) System templates, and (2) User templates. Both System and User templates may be created and managed by the system administrators using the Template Editor graphical user interface (GUI). FIG. 3 illustrates a display of such GUI.

Other than ownership, the System and User templates may be the same. Once installed, System templates may be available to everyone. User templates may be restricted to a particular subscriber. Often, User templates are created from modified System templates. A User template copied from a System template can have the same name. To simplify template name management, the User template is selected whenever name overlap occurs.

Tables 13-15 below provide examples of factory supplied ready for use templates. Table 13 shows a set of exemplary templates for generating new text email messages, table 14 shows a set of exemplary templates for generating reply text email messages, and table 15 shows a set of exemplary templates for generating forwarded text email messages. The items bracketed between "<" (less than) and ">" (greater than) characters are variables, some automatic, some prompted. For example, <your name>, <company signature>, <Original Message>, and <Original Subject> are automatic variables, while <calendar date>, <time>, <a subscriber's name>, and <time> are prompted variables.

TABLE 13

(New Text Email Templates)

| Speech Command | Email Body |
|---|---|
| "Can't Reach You" | Subject: I Can't Reach You, Please Call Me<br>I am currently away from the office. I haven't been able to reach you by telephone or leave you a message. Please give me a call.<br>Thank you,<br><your name><br><company signature> |
| "Gone Today" | Subject: Out of the Office Today<br>I am currently away from the office today. If needed, feel free to call me.<br>Thank you,<br><your name><br><company signature> |
| "Gone Until Day" | Subject: I'm Out of the Office<br>I am currently away from the office until <calendar date>. If needed, feel free to call me.<br>Thank you,<br><your name><br><company signature> |
| "Gone Until Time" | Subject: I'm Out of the Office<br>I am currently away from the office until <time>. If needed, feel free to call me.<br>Thank you,<br><your name><br><company signature> |
| "Out of Office" | Subject: I'm Out of the Office<br>I am currently away from the office. If needed, feel free to call me.<br>Thank you,<br><your name><br><company signature> |
| "Call Me" | Subject: Please Give Me a Call<br>I am currently away from the office. Please give me a call.<br>Thank you,<br><your name><br><company signature> |

TABLE 13-continued (New Text Email Templates)

| Speech Command | Email Body |
|---|---|
| "Enjoyed Speaking" | Subject: Enjoyed Speaking With You<br>I really enjoyed our recent conversation. Please call me if you have any further questions.<br>Thank you,<br><your name><br><company signature> |

TABLE 14

(Reply Text Email Templates)

| | |
|---|---|
| "Call Me" | Subject: RE: <Original Subject><br>I am currently away from the office, but would be interested in discussing this matter with you personally.<br>Please call me or leave a message.<br>Thank you,<br><your name><br><company signature><br><Original Message> |
| "Contact My Associate" | Subject: RE: <Original Subject><br>I am currently away from the office. For prompt assistance, please contact my associate <a subscriber's name>, at <telephone number>.<br>Thank you,<br><your name><br><company signature><br><Original Message> |
| "I Agree" | Subject: RE: <Original Subject><br>Thank you for your message. I agree with what you say. Please proceed as needed.<br>Thank you,<br><your name><br><company signature><br><Original Message> |
| "I Will Call You" | Subject: RE: <Original Subject><br>I am currently away from the office, but I am interested in discussing this matter with you personally. I will give you a call shortly.<br>Thank you,<br><your name><br><company signature><br><Original Message> |
| "Let's Discuss Further" | Subject: RE: <Original Subject><br>Thank you for your message. We need to discuss this matter more fully. I am currently away from the office so we can discuss this when I return or give me a call.<br>Thank you,<br><your name><br><company signature><br><Original Message> |
| "Set Up A Meeting" | Subject: RE: <Original Subject><br>I recommend calling a meeting to discuss this matter further. I am currently out of the office. Please set up the meeting and invite anyone else who is involved.<br>Thank you,<br><your name><br><company signature><br><Original Message> |
| "Received Your Message" | Subject: RE: <Original Subject><br>Thank you for your message. I will revi it and get back to you with any questions when I return to the office.<br>Thank you,<br><your name><br><company signature><br><Original Message> |

TABLE 15

(Forwarded Text Email Templates)

| Speech Command | Email Body |
|---|---|
| "Assist Customer" | Subject: FW: <Original Subject><br>I am currently away from the office and will not be able to address this customer's problem in a timely manner. I appreciate any help you can provide. If you have any questions, please call me.<br>Thank you,<br><your name><br><company signature><br><Original Message> |
| "Assist Me" | Subject: FW: <Original Subject><br>I am currently away from the office and will not be able to address this issue in a timely manner.<br>I appreciate any help you can provide.<br>If you have any questions, please call me.<br>Thank you,<br><your name><br><company signature><br><Original Message> |
| "For Your Information" | Subject: FW: <Original Subject><br>I just received this message. I am forwarding a copy for your information.<br>Thank you,<br><your name><br><company signature><br><Original Message> |
| "Set Up A Meeting" | Subject: FW: <Original Subject><br>I've just received this message. I recommend calling a meeting to discuss this matter further. I am currently out of the office. Please set up the meeting and invite anyone else who is involved.<br>Thank you,<br><your name><br><company signature><br><Original Message> |
| "Take Care of This" | Subject: FW: <Original Subject><br>I am currently away from the office and will not be able to address this issue. Please take care of this issue in my absence. If you have any questions, please call me or leave a message.<br>Thank you,<br><your name><br><company signature><br><Original Message> |

The process steps of the various methods described throughout this document are illustrated and explained serially. In specific non-limiting variants/embodiments, the process steps are implemented in the same order in which they are illustrated and/or explained. More generally, certain steps can be performed by separate elements in conjunction or in parallel, asynchronously or synchronously, in a pipelined manner, or otherwise. There is no particular requirement that the steps be performed in the same order in which this description lists them, except where explicitly so indicated or otherwise made clear from the context. Furthermore, not every illustrated step is required in every embodiment in accordance with the invention, while some steps that have not been specifically illustrated may be desirable or necessary in some embodiments in accordance with the invention. Each of the steps may encompass several sub-steps.

This document describes the inventive apparatus, methods, and articles of manufacture for template-based text message creation in considerable detail. This was done for illustration purposes only. Neither the specific embodiments of the invention as a whole, nor those of its features limit the general principles underlying the invention. The specific features described herein may be used in some embodiments and variants, but not in others, without departure from the spirit and scope of the invention as set forth. Various physical arrangements of components and various step sequences also fall within the intended scope of the invention. The invention is not limited to the use of specific components. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is carried out by the claims and their equivalents.

What is claimed is:

1. A method of communicating, the method comprising steps of:
   receiving a first sound input identifying a template for creating electronic messages, wherein the template comprises a body of predefined text and a first prompted variable corresponding to a first prompted variable text field of an electronic message, the step of receiving the first sound input being performed through a telephone connection between a user and a communication system;
   receiving a second sound input identifying the selected first variable value for the first prompted variable, the step of receiving the second sound input being performed through the telephone connection between the user and the communication system;
   determining from the second sound input the selected first variable value for the first prompted variable, wherein the selected first variable value is selected from a plurality of predefined values of the first prompted variable; and
   composing the electronic message from the template, wherein the step of composing comprises including the body of predefined text in the electronic message, and including the selected first variable value of the first prompted variable as text in the first variable text field of the electronic message.

2. A method in accordance with claim 1, further comprising:
   prompting the user through the telephone connection to provide the first sound input;
   prompting the user through the telephone connection to provide the selected first variable value for the first prompted variable;
   sending the electronic message from the communication system to one or more recipients.

3. A method in accordance with claim 2, wherein the step of determining from the second sound input comprises processing the second sound input with a dual tone multi-frequency (DTMF) decoder.

4. A method in accordance with claim 2, wherein the step of determining from the second sound input comprises processing the second sound input with an automatic speech recognition (ASR) module.

5. A method in accordance with claim 2, wherein the template was created by the user.

6. A method in accordance with claim 2, wherein:
   the step of including the selected first variable value of the first prompted variable as text in the first variable text field of the electronic message comprises selecting a selected format from a plurality of formats of the first prompted variable, and inserting the selected first variable value into the first variable text field of the electronic message in accordance with the selected format.

7. A method in accordance with claim 2, wherein the first prompted variable is a word variable specifying a phrase from a plurality of predefined phrases, each phrase of the plurality of phrases comprising at least one word.

8. A method in accordance with claim 2, wherein:
   the one or more recipients comprise a first recipient and a second recipient, and the step of sending comprises sending the electronic message from the communication system to the first recipient and to the second recipient;
   the method further comprising:
      prompting the user to identify the first recipient and the second recipient; and
      receiving through the telephone connection from the user a first identification of the first recipient and of a second identification of the second recipient.

9. A method in accordance with claim 2, wherein the template further comprises a second prompted variable corresponding to a second prompted variable text field of the electronic message, the method further comprising:
   prompting the user through the telephone connection to provide a selected second variable value for the second prompted variable;
   receiving from the user through the telephone connection a third sound input identifying the selected second variable value for the second prompted variable; and
   determining from the third sound input the selected second variable value for the second prompted variable, wherein the selected second variable value is selected from a plurality of predefined values of the second prompted variable;
   wherein the step of composing further comprises including the selected second variable value of the second prompted variable as text in the second variable text field of the electronic message.

10. A method in accordance with claim 2, further comprising establishing the telephone connection.

11. A method in accordance with claim 10, wherein the step of establishing the telephone connection comprises a step for establishing the telephone connection in accordance with a Call Me Back feature.

12. A method in accordance with claim 10, wherein the step of establishing the telephone connection comprises:
   receiving from the user a designated telephone number; and
   calling the user at the designated telephone number.

13. A method in accordance with claim 12, wherein the step of calling the user is performed by the communication system immediately after receiving the designated number from the user.

14. A method in accordance with claim 2, wherein the electronic message is an email message comprising an attachment.

15. A method in accordance with claim 14, wherein the attachment comprises a facsimile.

16. A method in accordance with claim 2, wherein the electronic message is an Instant Message (IM).

17. A method in accordance with claim 12, wherein the electronic message is a Short Message Service (SMS) message.

18. A communication system comprising:
   a telephone interface configured to receive telephone calls;
   an interface configured to send electronic messages;
   a memory storing code; and
   a processor coupled to the memory, the telephone interface, and the interface configured to send electronic messages;
   wherein the processor is configured to execute the code to cause the communication system to perform steps comprising:

connecting a user to the communication system through the telephone interface;

receiving from the user through the telephone interface a first sound input identifying a template for creating electronic messages, wherein the template comprises a body of predefined text and a first prompted variable corresponding to a first prompted variable text field of an electronic message;

prompting the user through the telephone interface to provide a selected first variable value for the first prompted variable;

receiving from the user a second sound input identifying the selected first variable value for the first prompted variable, the step of receiving the second sound input being performed through the telephone interface;

determining from the second sound input the selected first variable value for the first prompted variable, wherein the selected first variable value is selected from a plurality of predefined values of the first prompted variable;

composing the electronic message from the text template, wherein the step of composing comprises including the selected first variable value of the first prompted variable as text in the first variable text field of the electronic message, and including the body of predefined text in the electronic message; and sending the electronic message through the interface configured to send electronic messages.

19. An article of manufacture comprising non-transitory machine-readable storage medium with program code stored in the medium, wherein the program code stores computer instructions for performing steps comprising:

receiving a first sound input identifying a template for creating electronic messages, wherein the template comprises a body of predefined text and a first prompted variable corresponding to a first prompted variable text field of an electronic message, the step of receiving the first sound input being performed through a telephone connection between a user and a communication system;

prompting the user through the telephone connection to provide a selected first variable value for the first prompted variable;

receiving a second sound input identifying the selected first variable value for the first prompted variable, the step of receiving the second sound input being performed through the telephone connection between the user and the communication system;

determining from the second sound input the selected first variable value for the first prompted variable, wherein the selected first variable value is selected from a plurality of predefined values of the first prompted variable; and composing the electronic message from the text template, wherein the step of composing comprises including the body of predefined text in the electronic message, and including the selected first variable value of the first prompted variable as text in the first variable text field of the electronic message.

20. An article of manufacture according to claim 19, wherein the program code further stores computer instructions for sending the electronic message from the communication system to one or more recipients.

* * * * *